(12) United States Patent
Xiao et al.

(10) Patent No.: US 9,036,813 B2
(45) Date of Patent: May 19, 2015

(54) POWER EFFICIENCY OF A LINE DRIVER

(71) Applicant: Futurewei Technologies, Inc., Plano, TX (US)

(72) Inventors: Ruijie Xiao, Shenzhen (CN); Guozhu Long, Fremont, CA (US); Zhilei Zhao, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/166,180

(22) Filed: Jan. 28, 2014

(65) Prior Publication Data

US 2014/0169552 A1 Jun. 19, 2014

Related U.S. Application Data

(63) Continuation of application No. 12/756,105, filed on Apr. 7, 2010, now Pat. No. 8,693,676.

(60) Provisional application No. 61/167,400, filed on Apr. 7, 2009.

(51) Int. Cl.
*G05F 1/10* (2006.01)
*H04M 3/00* (2006.01)
(Continued)

(52) U.S. Cl.
CPC ............ *H04M 3/007* (2013.01); *H04L 5/0007* (2013.01); *H04L 25/0272* (2013.01); *H04L 25/028* (2013.01); *H04L 27/2626* (2013.01)

(58) Field of Classification Search
CPC ... H04M 3/007; H04L 25/0272; H04L 25/028
USPC .................. 327/108, 112, 536, 540; 363/59; 365/198; 375/257; 379/399.01, 401
See application file for complete search history.

(56) References Cited

U.S. PATENT DOCUMENTS

| 5,160,929 A | 11/1992 | Costello |
| 5,255,224 A | 10/1993 | Galbi et al. |

(Continued)

FOREIGN PATENT DOCUMENTS

| CN | 1411648 A | 4/2003 |
| CN | 1636366 A | 7/2005 |

(Continued)

OTHER PUBLICATIONS

Foreign Communication From a Counterpart Application, Russian Application No. 2011144889, Russian Notice of Allowance dated Dec. 18, 2013, 9 pages.

(Continued)

*Primary Examiner* — Gerald Gauthier
(74) *Attorney, Agent, or Firm* — Conley Rose, P.C.; Grant Rodolph; William H. Dietrich

(57) ABSTRACT

An apparatus comprising a first line driver, a second line driver, a charge pump, and a control logic circuit coupled to the first line driver and the second line driver and configured to disable the charge pump when both a first control signal associated with the first line driver and a second control signal associated with the second line driver indicate a charge pump disable state. A network component comprising at least one processor configured to implement a method comprising receiving a first control signal and a second control signal, disabling a charge pump when both the first control signal and the second control signal indicate a charge pump disable state, and operating the charge pump to boost a voltage when the first control signal, the second control signal, or both indicate a charge pump active state.

20 Claims, 10 Drawing Sheets

(51) Int. Cl.
*H04L 5/00* (2006.01)
*H04L 25/02* (2006.01)
*H04L 27/26* (2006.01)

(56) References Cited

U.S. PATENT DOCUMENTS

| | | | |
|---|---|---|---|
| 5,650,979 | A | 7/1997 | Komarek et al. |
| 5,717,557 | A | 2/1998 | Gonzalez et al. |
| 5,726,944 | A | 3/1998 | Pelley, III et al. |
| 5,901,055 | A | 5/1999 | Yi et al. |
| 6,246,283 | B1 * | 6/2001 | Ahuja et al. ............... 330/109 |
| 6,281,747 | B2 * | 8/2001 | Ahuja et al. ............... 330/109 |
| 6,323,733 | B1 | 11/2001 | Gorcea et al. |
| 6,333,654 | B1 | 12/2001 | Harris et al. |
| 6,498,521 | B1 | 12/2002 | Bicakci et al. |
| 6,531,902 | B1 * | 3/2003 | Tennen et al. ............... 327/108 |
| 6,577,189 | B2 * | 6/2003 | Jayaraman et al. ......... 330/107 |
| 6,614,310 | B2 | 9/2003 | Quarfoot et al. |
| 6,628,166 | B2 * | 9/2003 | Delano ....................... 330/251 |
| 6,630,899 | B2 * | 10/2003 | Jayaraman ................. 341/200 |
| 6,801,086 | B1 * | 10/2004 | Chandrasekaran ......... 330/140 |
| 6,920,336 | B2 * | 7/2005 | Ferianz ..................... 455/552.1 |
| 6,975,843 | B2 * | 12/2005 | Simonsen ................... 455/126 |
| 7,031,457 | B2 | 4/2006 | Melsa |
| 7,130,415 | B2 | 10/2006 | Melsa et al. |
| 7,177,418 | B2 * | 2/2007 | Maclean et al. ......... 379/395.01 |
| 7,285,992 | B1 * | 10/2007 | Maida ......................... 327/112 |
| 7,333,373 | B2 * | 2/2008 | You et al. .................... 365/198 |
| 7,400,191 | B2 * | 7/2008 | Rodriguez .................... 330/10 |
| 7,403,405 | B2 * | 7/2008 | Conte et al. ................... 363/59 |
| 7,595,683 | B1 | 9/2009 | Floyd |
| 7,649,948 | B2 * | 1/2010 | Hauptmann et al. ......... 375/257 |
| 7,705,672 | B1 * | 4/2010 | Rodriguez .................... 330/10 |
| 7,834,692 | B2 | 11/2010 | Bae et al. |
| 8,054,100 | B1 | 11/2011 | Liao et al. |
| 8,068,622 | B2 | 11/2011 | Melanson et al. |
| 8,259,821 | B2 * | 9/2012 | Hauptmann et al. ......... 375/257 |
| 8,311,243 | B2 | 11/2012 | Tucker et al. |
| 8,693,676 | B2 * | 4/2014 | Xiao et al. ............... 379/399.01 |
| 2001/0004387 | A1 | 6/2001 | Barkaroe |
| 2003/0062926 | A1 | 4/2003 | Wilcox et al. |
| 2004/0001586 | A1 | 1/2004 | Melsa et al. |
| 2006/0290414 | A1 * | 12/2006 | Kim et al. .................... 327/536 |
| 2009/0072865 | A1 | 3/2009 | Bae et al. |
| 2009/0115498 | A1 * | 5/2009 | Al-Shamma et al. ......... 327/536 |
| 2010/0253420 | A1 * | 10/2010 | Xiao et al. .................... 327/540 |
| 2014/0169552 | A1 * | 6/2014 | Xiao et al. .................... 379/401 |

FOREIGN PATENT DOCUMENTS

| | | |
|---|---|---|
| EP | 0299639 A2 | 1/1989 |
| GB | 2451524 A | 2/2009 |
| RU | 2097932 C1 | 11/1997 |
| RU | 19240 U1 | 8/2001 |
| RU | 2214044 C1 | 10/2003 |

OTHER PUBLICATIONS

Foreign Communication From a Counterpart Application, Russian Application No. 2011144889, English Translation of Russian Notice of Allowance dated Dec. 18, 2013, 6 pages.
Notice of Allowance dated Oct. 28, 2013, 13 pages, U.S. Appl. No. 12/756,105, dated Apr. 7, 2010.
Office Action dated Jun. 17, 2013, 8 pp., U.S. Appl. No. 12/756,105, dated Apr. 7, 2010.
Foreign Communication from a counterpart application, PCT application PCT/US2010/030298, International Search Report dated Sep. 24, 2010, 9 pages.
Foreign Communication from a counterpart application, PCT application PCT/US2010/030298, Written Opinion dated Sep. 24, 2010, 10 pages.
Pierdomenico, J., et al., "A 684-mW Adaptive Supply Full-Rate ADSL CO Driver", IEEE Journal of Solid-State Circuits, vol. 37, No. 12, Dec. 2002, pp. 1831-1838.
Wilson, J., "Zero-Overhead Class-G Drivers Improve Power Efficiency in ADSL Line Cards", URL: http://www.analogzone.com/nett0620.pdf, Aug. 23, 2006, 8 pages.
Foreign Communication From a Counterpart Application, Chinese Application No. 201080007811.4, Chinese Search Report dated Jan. 18, 2013, 2 pages.
Foreign Communication From a Counterpart Application, Chinese Application No. 201080007811.4, Chinese Office Action dated Feb. 1, 2013, 5 pages.
Foreign Communication From a Counterpart Application, Chinese Application No. 201080007811.4, Partial English Translation of Chinese Office Action dated Feb. 1, 2013, 3 pages.
Foreign Communication From a Counterpart Application, Russian Application No. 2011144889/07, Russian Office Action with English Translation dated Mar. 1, 2013, 8 pages.
Foreign Communication From a Counterpart Application, Chinese Application No. 201080007811.4, Chinese Office Action dated Jul. 11, 2013, 5 pages.
Foreign Communication From a Counterpart Application, Chinese Application No. 201080007811.4, Partial Translation of Chinese Office Action dated Jul. 11, 2013, 4 pages.
Foreign Communication From a Counterpart Application, Mexican Application No. MX/a/20111010627, Mexican Office Action dated Nov. 7, 2013, 3 pages.
Foreign Communication From a Counterpart Application, Mexican Application No. MX/a/2011/010627, English Translation of Mexican Office Action dated Nov. 7, 2013, 3 pages.

\* cited by examiner

POWER EFFICIENCY OF A LINE DRIVER

CROSS-REFERENCE TO RELATED APPLICATIONS

The present application is a continuation of U.S. patent application Ser. No. 12/756,105, filed Apr. 7, 2010 by Ruijie Xiao, et al., and entitled "Power Efficiency of the Line Driver," which claims priority to U.S. Provisional Patent Application No. 61/167,400 filed Apr. 7, 2009 by Ruijie Xiao et al., and entitled, "Power Efficiency of the Line Driver," both which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital Subscriber Line (DSL) technology is a high-bandwidth and/or high-speed data transmission technology implemented using twisted pair wires, e.g. unshielded twisted pairs. For example, DSL technologies include Asymmetrical Digital Subscriber Line (ADSL), Very-high-bit-rate Digital Subscriber Line (VDSL), Integrated Services Digital Network (ISDN)-based Digital Subscriber Line (IDSL), and Single-pair High-bit-rate Digital Subscriber Line (SHDSL). In many DSL communication systems, a power amplifier (PA), which is sometimes called a line driver, is typically used to amplify the output signal before it is sent to the transmission media, e.g. twisted pair wires. The line driver can consume a large percentage of the total power used by the DSL system. As semiconductor technologies improve, the power consumption for digital signal processing of the DSL system has been reduced considerably, but the power consumption of the line driver still remains substantially high. As a result, the line driver may consume even a larger percentage of the total power used in the DSL system.

SUMMARY

In one embodiment, the disclosure includes an apparatus comprising a first line driver, a second line driver, a charge pump, and a control logic circuit coupled to the first line driver and the second line driver and configured to disable the charge pump when both a first control signal associated with the first line driver and a second control signal associated with the second line driver indicate a charge pump disable state.

In another embodiment, the disclosure includes a network component comprising at least one processor configured to implement a method comprising receiving a first control signal and a second control signal, disabling a charge pump when both the first control signal and the second control signal indicate a charge pump disable state, and operating the charge pump to boost a voltage when the first control signal, the second control signal, or both indicate a charge pump active state.

In yet another embodiment, the disclosure includes a method comprising receiving a first peak signal, predicting a second peak signal subsequent to the first peak signal, delaying the first peak signal, generating a first control signal to turn on a charge pump based on the second peak signal, and generating a second control signal to boost a voltage using the charge pump based on the first control signal.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The amplitude of a transmitted DSL signal, e.g. using discrete multi-tone (DMT) or Orthogonal Frequency Division Multiplexing (OFDM) modulation technologies, may have a relatively high peak-to-average ratio, where the signal peak may vary between relatively high and low peaks. Further, the high signal peak may occur less frequently than the low signal peak over the total transmission time, and thus may have a substantially shorter time than the total transmission time. A typical line driver referred to as a Class AB line driver may use a power supply that has a substantially high dynamic range voltage to amplify the relatively low and high signal peaks. The high dynamic range voltage may ensure the amplification of the high signal peak without clipping that may distort the signal. However, using such power supply may increase the power consumption of the line driver.

Disclosed herein is a system and method to reduce the power consumption of a line driver for DSL communications. The line driver may be configured to switch between a low and high voltage value of a power supply to amplify a relatively low or high peak signal, respectively. The line driver may use a charge pump to switch the voltage value of the power supply to the high value, e.g. similar to a Class H line driver. Since the high peak signal may occur substantially less frequently than the low peak signal during transmission time, the high voltage value may be used substantially less frequently than the low voltage value, which may reduce the overall power consumption of the line driver over the transmission time. Additionally, the line driver power efficiency may be improved by turning on the charge pump to amplify a high peak signal and turning off the charge pump otherwise, which may reduce the power consumed by the charge pump, and thus the overall power in the line driver.

Figure 1:
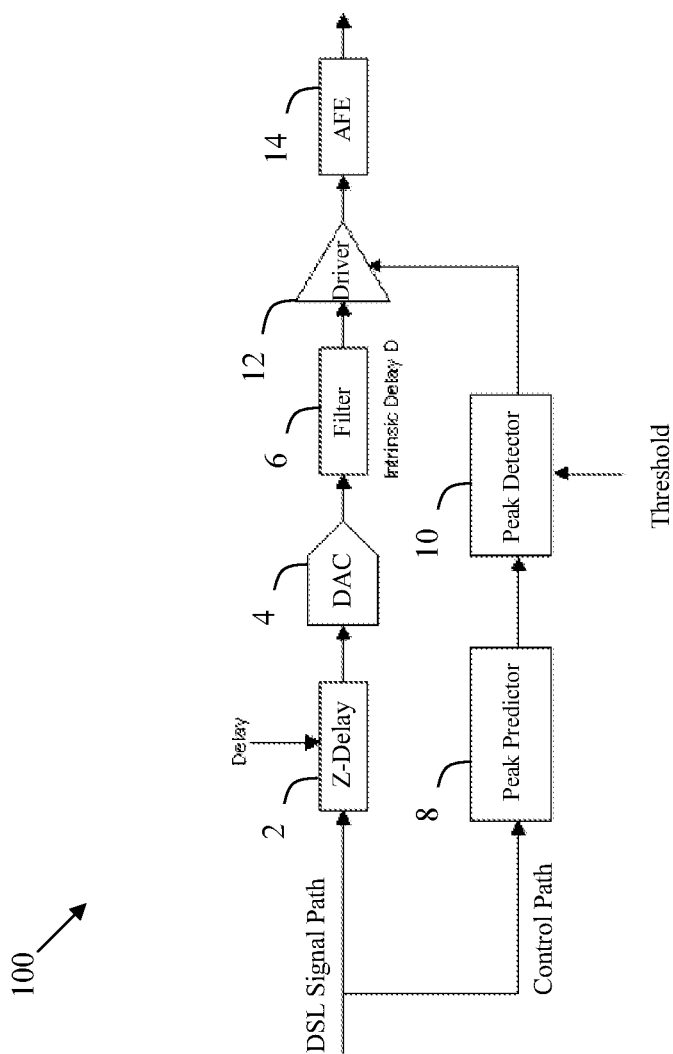
FIG. 1 is a schematic diagram of an embodiment of a line driver.

Different line driver techniques may be used to reduce the power consumption of the line driver. FIG. 1 illustrates an embodiment of a line driver 100 that may be a Class G line driver. The Class G line driver may use two power supply rails (not shown) that provide a low voltage and a high voltage, respectively. The high voltage may be used when the amplitude of the signal is relatively large, e.g. beyond a threshold value. The low voltage may be used when the amplitude of the signal is relatively low, e.g. below the threshold value. Since the amplitude of the signal may be relatively low most of the time, the Class G line driver may remain using the low voltage most of the time, which may result in a substantial power reduction.

The line driver 100 may comprise a delay circuit 2, a digital-to-analog-converter (DAC) 4, a filter circuit 6, a peak predictor 8, a peak detector 10, a driver 12, and an analog front end (AFE) 14. The components of the line driver 100 may be arranged as shown in FIG. 1. The delay circuit 2, which may be a Z-delay circuit, may delay the forwarding of an incoming signal (e.g. an ADSL signal) by adding a delay time to the signal. The DAC 4 may convert the DSL signal forwarded by the delay circuit 2 from analog to digital form, and send the signal to the filter circuit 6. The filter circuit 6 may process the digital signal to remove from the signal an intrinsic delay D that may be introduced by the line driver circuitry. The filtered signal may then be sent to the driver 12.

The peak predictor 8 may receive a copy of the incoming DSL signal at the delay circuit 2 and may predict a subsequent peak for the signal based on the current incoming signal peak. For instance, the incoming signal may be sent to the delay circuit 2 on a first path (the DSL signal path) and the copy of the signal may be sent to the peak predictor 8 on a second path (the control path). The predicted subsequent peak may be an estimate of the next signal peak that is expected to be received by the line driver 100.

The peak predictor 8 may send the predicted subsequent peak to the peak detector 10, which may detect and compare the peak value or signal amplitude to a threshold value to determine whether the signal peak is a high signal peak or a low signal peak. If the signal peak is a high signal peak, e.g. above the threshold value, then the peak detector 10 may switch the voltage of the driver 12 to high. Otherwise, if the signal peak is low the peak detector 10 may switch the voltage to low. Due to the delay time introduced by the delay circuit 2, the signal peak received at the driver 12 may match the predicted signal peak by the peak predictor 8, and hence the peak detector 10 may switch the driver 12 in accordance with the input signal from the first path (e.g. the ADSL signal path). The AFE 14 may then convert the amplified signal from the driver 12 from digital to analog format.

As described above, the line driver 100, e.g. the Class G line driver, may use two power supply voltages or two power supply rails to amplify the low and high signal peaks, respectively, which may increase the complexity and power consumption of the power supply circuit. Alternatively, a modified line driver referred to as a Class H line driver may be used to reduce the power consumption in the line driver. The Class H line driver may use an adjustable power supply rail or voltage based on the received signal peak or amplitude. The rail or voltage may be adjusted to track the input signal peak and to be slightly larger than the output signal of the driver at any given time. As such, the output stage of the signal may be operated at improved efficiency during substantially all the transmission time. The tracking rails or voltages may be obtained using direct current (DC) to DC power (DC-DC). In the Class H line driver, significant power efficiency gains may be achieved but at the expense of a more complicated power supply design and reduced Total Harmonic Distortion (THD) performance.

The Class H line driver may comprise a single external power supply coupled to a charge pump, which may be used to adjust the line driver's power rail according to the signal amplitude envelop to achieve better power efficiency. Alternatively, a modified Class H line driver may use an external power supply and a charge pump that may switch the power rail between a high voltage and a low voltage instead of tracking the signal amplitude envelope. For instance, when the signal peak is low, the line driver may use the low voltage as the power supply, and when the signal peak is high, the charge pump may be activated to use the high voltage as the power supply.

Figure 2:
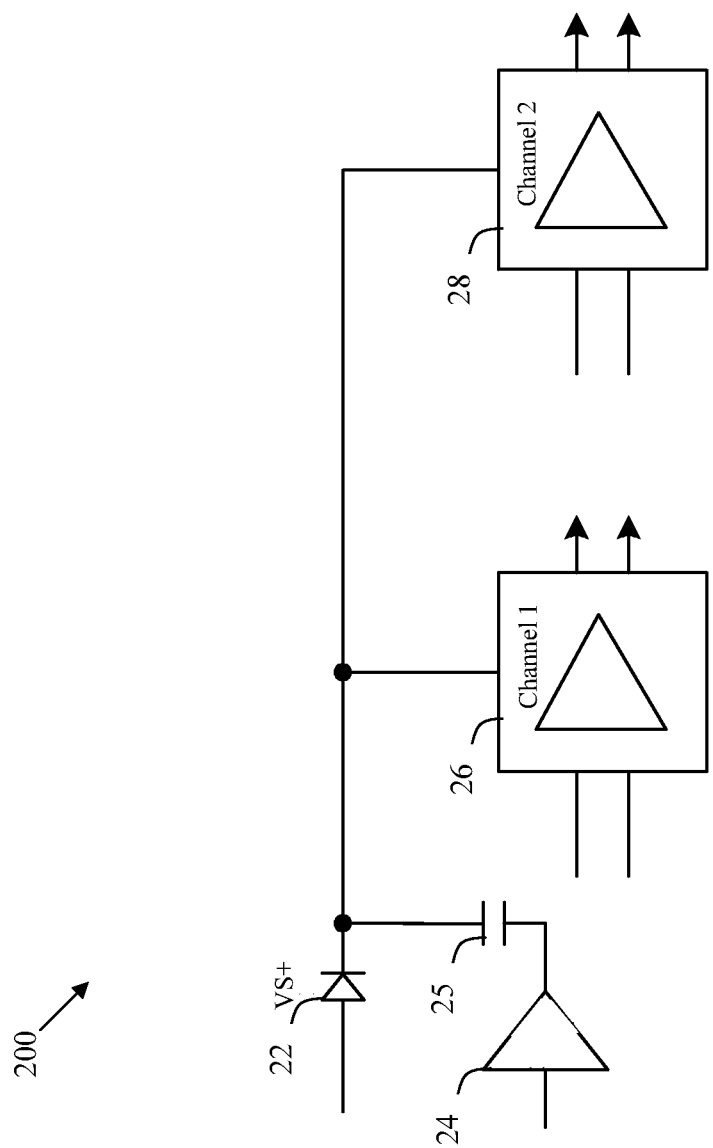
FIG. 2 is a schematic diagram of an embodiment of a dual channel line driver.

FIG. 2 illustrates an embodiment of a dual channel line driver 200, which may comprise a Class H line driver. FIG. 2 shows a functional block of the dual channel line driver 200. The dual channel line driver 200 may comprise a diode 22, a charge pump 24, a capacitor 25, a first line driver 26 that corresponds to a first channel (Channel 1), and a second line driver 28 that corresponds to a second channel (Channel 2). The components of the dual channel line driver 200 may be arranged as shown in FIG. 2. The first line driver 26 and the second line driver 28 may be each a Class AB line driver, e.g. similar to the line driver 100. When the output signals from both the first line driver 26 and the second line driver 28 are small, e.g. comprise low peaks, the diode 22 may be forward biased, and thus a positive voltage, VS+, may be supplied to both the first line driver 26 and second line driver 28. The VS+ values may correspond to a relatively low voltage value in the dual channel line driver 200 to amplify the relatively low peak signals.

However, when at least one of the line drivers outputs a high voltage or peak signal, a high voltage may be provided to both line drivers. Specifically, the high voltage may be provided to the first line driver 26 and the second line driver 28 by reverse biasing the diode 22, and hence blocking the low VS+ voltage value, and activating the charge pump 24 to supply a higher voltage value to the two line drivers. In this case, although one of the line drivers may not need the high voltage power supply, the charge pump 24 may be activated to boost the power supply for both the first line driver 26 and the second line driver 28. Consequently, the power consumption of the dual channel line driver 200 may be substantially and unnecessarily increased. The power consumption of the Class H line driver may also be increased due to additional integrated circuits that may be used to control the charge pump 24. For example, the additional integrated circuits may be digital circuits that consume from 50 milliwatt (mW) to 200 mW of power. This amount of power may be substantial, e.g. in comparison to the total power consumption of the line driver. Therefore, to further improve the power efficiency, it may be advantageous to reduce the power consumption of the charge pump used in a Class H line driver.

Figure 3:
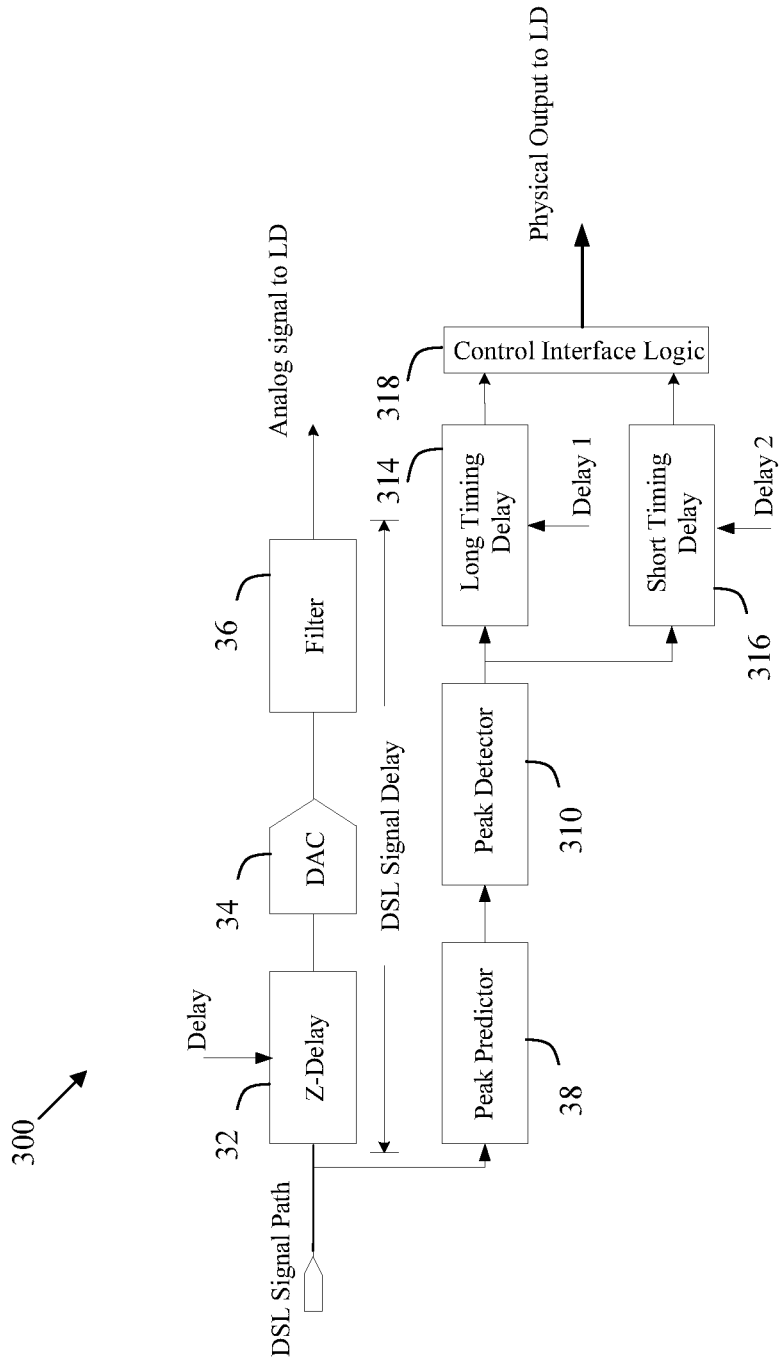
FIG. 3 is a schematic diagram of another embodiment of a line driver.

FIG. 3 illustrates an embodiment of a line driver 300, which may be used in a dual channel line driver to reduce its charge pump's power consumption. The line driver 300 may comprise a delay circuit 32, a DAC 34, a filter circuit 36, a peak predictor 38, and a peak detector 310, which may be configured substantially similar to the corresponding components of the line driver 100. The filter circuit 36 may be coupled to a driver or a line driver (LD) (not shown) and may send an analog signal to the driver for amplification. Additionally, the line driver 300 may comprise a long timing delay circuit 314 and a short timing delay circuit 316, which may be coupled in parallel to the peak detector 310 and a control interface logic 318.

The delay circuit 32 in the line driver 300 may introduce a longer time delay to an incoming signal, e.g. ADSL or VDSL signal, than the delay circuit 2 in the line driver 100. The delay time introduced by the delay circuit 32 may be fixed and may allow the peak detector 310 more time to control the charge pump circuit of the line driver 300 (not shown). Similar to the line driver 100, the line driver 300 may comprise a first path (DSL signal path) for the incoming signal and a second path (control path) to send a copy of the signal to the peak predictor 38. The long timing delay circuit 314 and the short long timing delay circuit 316 may introduce a relatively long time delay (Delay 1) and a relatively short time delay (Delay 2), respectively, to the signal on the control path. The relatively long time delay may introduce a delay to the control signal from the peak detector 310 to properly control the charge pump and adjust the power rail (e.g. the voltage) of the line driver. The second time delay may introduce a shorter delay to the control signal from the peak detector 310 to control the charge pump's power circuit that powers on or off the line driver. The delayed control signals may be sent to the control interface logic 318, which may select and forward one of the two delayed control signals to the driver or LD. Thus, the driver or LD may receive the physical output (e.g. control signal) from the control path at a sufficient time advance to amplify the analog DSL signal from the signal path.

Figure 4:
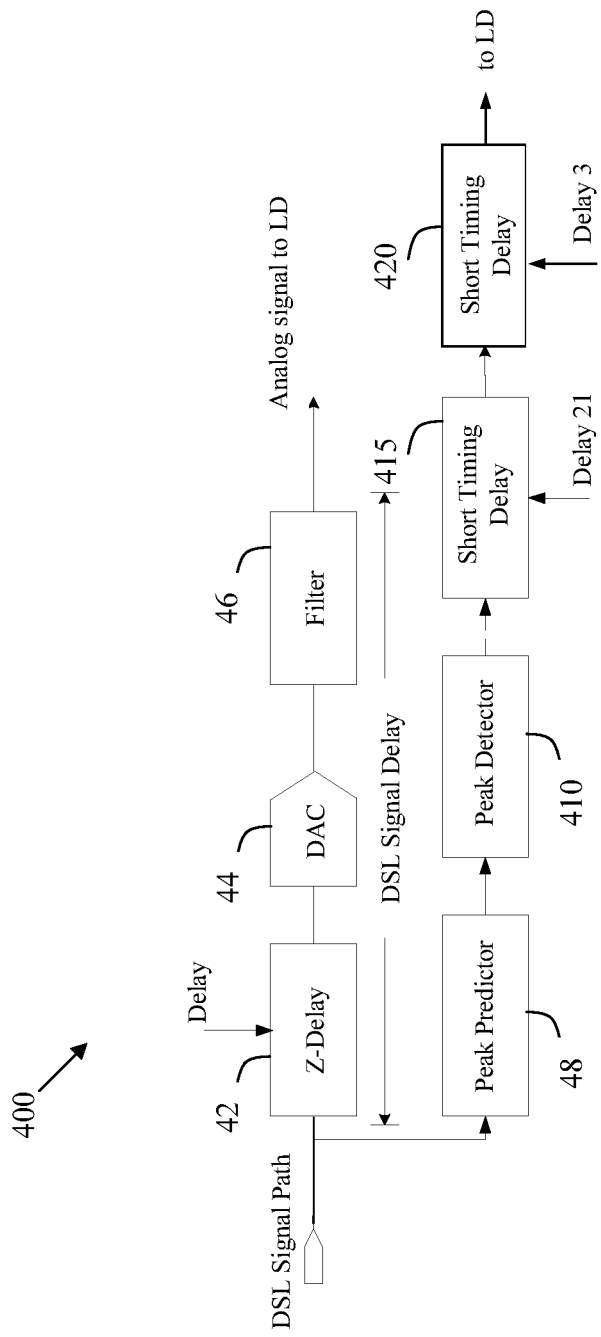
FIG. 4 is a schematic diagram of another embodiment of a line driver.

FIG. 4 illustrates an embodiment of another line driver 400, which may be used in a dual channel line driver to reduce its charge pump's power consumption. The line driver 400 may comprise a delay circuit 42, a DAC 44, a filter circuit 46, a peak predictor 48, and a peak detector 410, which may be configured substantially similar to the corresponding components of the line driver 300. Additionally, the line driver 400 may comprise a first short timing delay circuit 415 and a second short timing delay circuit 420, which may be coupled in series to the control path of the line driver 400 as shown in FIG. 4. The first short timing delay circuit 415 may add a first relative short time delay (Delay 21) to the control signal on the control path and the second short time delay circuit 420 may add an additional second short time delay (Delay 3) to the control signal. For instance, the first short time delay circuit 415 may send a delayed control signal to power on or off the charge pump and the second short time delay circuit 420 may extend the delay time of the control signal and send the extended delayed control signal to control the voltage applied by the charge pump to the line driver. The first short time delay circuit 415 and the second short time delay circuit 420 may be used to delay a control signal for the LD or for an AFE, e.g. based on the requirements of the system.

Figure 5:
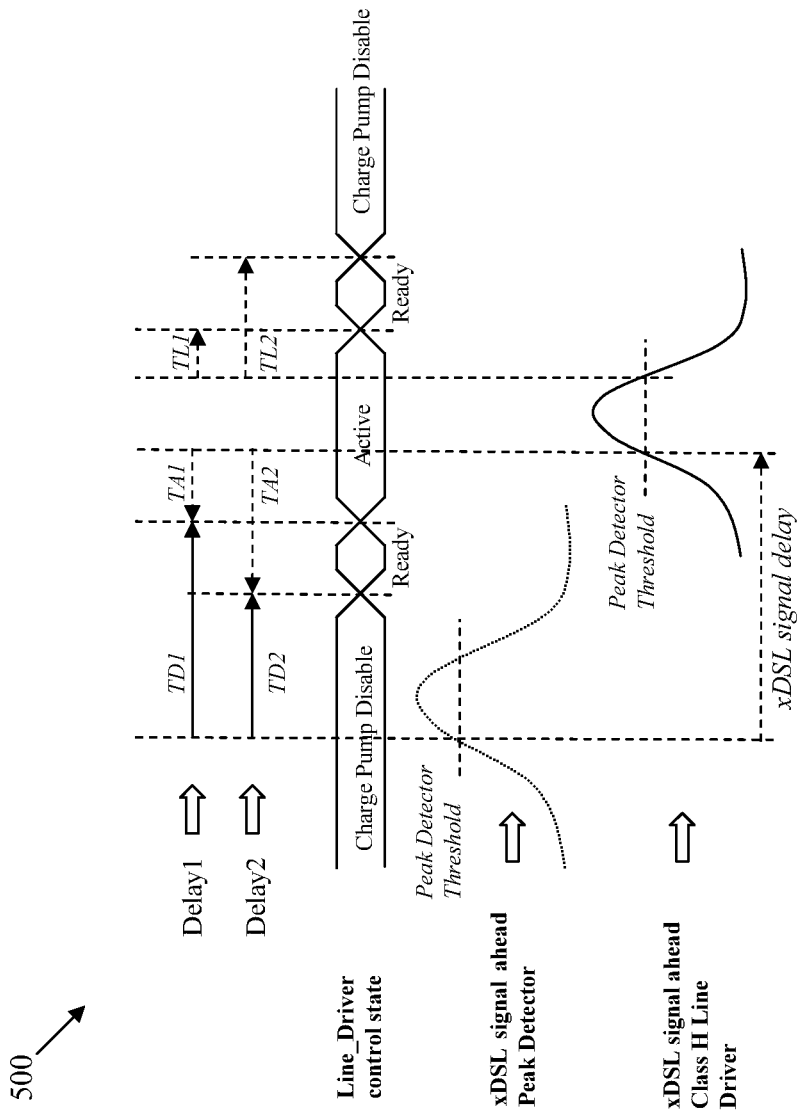
FIG. 5 is a schematic diagram of an embodiment of a line driver control scheme.

FIG. 5 illustrates an embodiment of a line driver control scheme 500, which may be used to control the charge pump of the line driver to provide the appropriate voltage based on the incoming signal peak at the driver (e.g. amplifier) in the line. The line driver control scheme 500 may be implemented using an improved Class H line driver, such as the line driver 300 or the line driver 400. Initially, the charge pump may be disabled, e.g. powered off state, when the peak detector detects an expected incoming signal peak that may be above the threshold value and therefore that may correspond to a high signal peak. Upon detecting the high signal peak, a first delay control signal (Delay 1) may be sent on the control path to the driver to control the power rail and apply a high voltage to the driver at the proper time, e.g. when the driver is expected to receive the high peak signal. A second delay control signal (Delay 2) may be sent, e.g. at about the same time, to activate the charge pump and ready the charge pump to apply the proper voltage to the driver before receiving the first delay control signal.

For example, the delay time for the Delay 1 control signal may be equal to about TD1 and the delay time for the Delay 2 control signal may be equal to about TD2, where TD1 may be greater than TD2. Accordingly, the control state of the line driver may change from the charge pump disable state to the ready state upon receiving the Delay 2 control signal and turning on the charge pump (e.g. during time TA2–TA1). Subsequently, the control state of the line driver may change from the ready state to the active state upon receiving the Delay 1 control signal and applying the proper voltage. The voltage may then be tuned off, e.g. after a first predetermined time (TL1), and the control state may change back from the active state to the ready state (e.g. during time TL2–TL1). Subsequently, the charge pump may also be turned off after a second predetermined time (TL2), and the control state may return to the charge pump disable state. The second predetermined time may be greater than the first predetermined time to allow the voltage to be turned off before disabling the charge pump.

In some embodiments, a plurality of Class H line drivers, such as the line driver 300 and/or the line driver 400, may share the same power supply rail. However, since the incoming signal peaks in the line drivers may be different, e.g. at the same transmission time or window, the shared charge pump may need to provide different voltage values to the line drivers. In such a case, a plurality of control signals may be generated and provided to the corresponding line drivers to control each line driver independently.

Figure 6:
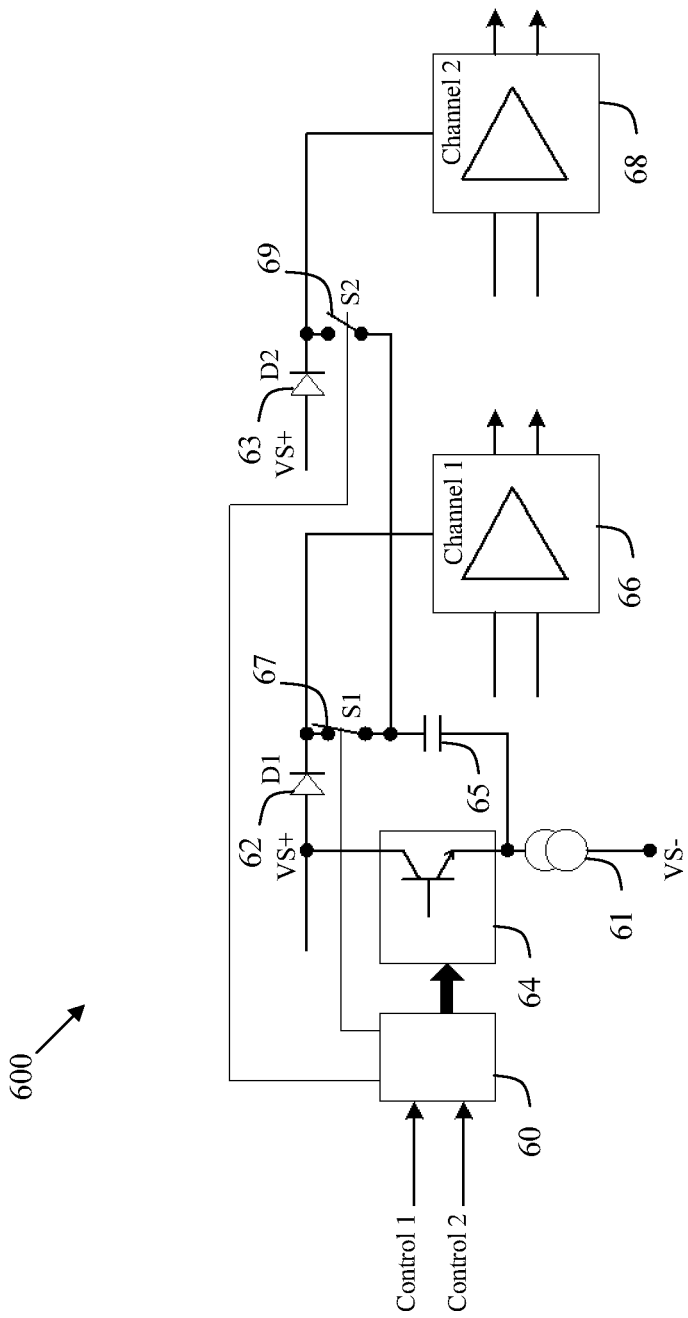
FIG. 6 is a schematic diagram of another embodiment of a dual channel line driver.

FIG. 6 illustrates an embodiment of another dual channel line driver 600, which may have reduced power consumption and improved power efficiency. The dual channel line driver 600 may comprise an improved Class H line driver, which may be configured to reduce its charge pump's power consumption. The dual channel line driver 600 may comprise a first diode 62 (D1), a charge pump 64, a capacitor 65, a first line driver 66 that corresponds to a first channel (Channel 1), and a second line driver 68 that corresponds to a second channel (Channel 2), which may be substantially similar to the corresponding components of the dual channel line driver 200. Additionally, the dual channel line driver 600 may comprise a logic circuit 60, at least one current mirror 61, a second diode 63 (D2), a first switch 67 (S1), and a second switch 69 (S2), which may be arranged as shown in FIG. 6.

In the dual line driver 600, the first line driver 66 and the second line driver 68 may be independently controlled, e.g. to switch between a low voltage and a high voltage based on their corresponding received peak signals. Additionally, unlike the dual channel line driver 600, the charge pump 64 may be turned on or off to apply the appropriate voltage for the first line driver 66 and the second line driver 68 independently. As such, the charge pump 64 may not necessarily be activated to boost the power supply for both the first line driver 66 and the second line driver 68 when one of the line drivers 66 and 68 may not need the high voltage power supply.

The charge pump 64 may be controlled for the two line drivers independently using a first control signal (Control 1) for the first channel, Channel 1, and a second control signal (Control 2) for the second channel, Channel 2. The control signals Control 1 and Control 2 may be applied to the logic circuit 60. Each of the control signals may be set to one of three states: (a) a charge pump disable state, (b) a charge pump ready state, and (c) a charge pump active state. The charge pump disable state may correspond the powering off of the charge pump 64 and its associated circuits, except the current mirror 61. The charge pump ready state may correspond to powering on the charge pump 64 and its circuits, e.g. without boosting the high voltage. The charge pump active state may correspond to powering on the charge pump 64 and boosting the high voltage.

Since the dual channel line driver 600 may have only one charge pump circuit, the charge pump 64 may be disabled when the control signals of both Channel 1 and Channel 2 (e.g. Control 1 and Control 2, respectively) indicate a charge pump disable state. Specifically, when both Control 1 or Control 2 indicate the charge pump active state, then the charge pump 64 may be in the active state, e.g. may be powered on and boosting the high voltage to the driver. Alternatively, when one of Control 1 and Control 2 indicates the charge pump ready state and the other control signal does not indicate the charge pump active state, then the charge pump 64 may be in the ready state, e.g. may be turned on without boosting the high voltage. However, when both Control 1 and Control 2 indicate the charge pump disable state, then the charge pump 64 may be in the disable state, e.g. may be powered off.

The current mirror 61 circuit may be active and turned on substantially the entire time during use, e.g. unless the entire dual channel line driver 600 is off-line. As such, even when the charge pump 64 is disabled, the capacitor 65 may be charged by the current mirror 61, which may reflect incoming current or electricity to the capacitor 65, and thus may be in a substantial full charged state to boost a high voltage to the driver at any time. When the capacitor 65 is substantially fully charged, the power consumption of the current mirror 61 may be negligible. The first switch 67 and the second switch 69 may be controlled by the logic circuit 60 to apply appropriate voltage to Channel 1 and/or Channel 2 based on the received Control 1 and Control 2 signals. Specifically, when both Control 1 and Control 2 indicate the charge pump active state, then both S1 and S2 may be closed, e.g. to supply a voltage VS+ to both Channel 1 and Channel 2, as indicated by the L-shaped solid directional arrows in FIG. 6. The second diode 63, D2, may be configured similar to the first diode 62, D1, to supply the voltage VS+ to Channel 2. When Control 1 indicates the charge pump active state and Control 2 indicates the charge pump ready state, then S1 may be closed and S2 may be opened, e.g. to supply a voltage to Channel 1 but not to Channel 2. Alternatively, when Control 1 indicates the charge pump ready state and Control 2 indicates the charge pump active state, then S1 may be opened and S2 may be closed, e.g. to supply the voltage to Channel 2 but not to Channel 1. However, when neither Control 1 nor Control 2 indicates the charge pump active state, then one of S1 and S2 may be closed or both S1 and S2 may be closed, e.g. to allow charging of the capacitor 65 by the current mirror 61 via S1 and/or S2, as indicated by the dashed directional arrow in FIG. 6.

The control scheme described above may be implemented for multi-channel line drivers, such as Class H line drivers, that comprise a plurality of channels (e.g. individual line drivers) that share a charge pump. Each channel's power supply in the multi-channel line driver may be independently controlled to boost only when it's needed. As such, higher power efficiency may be achieved.

Figure 7:
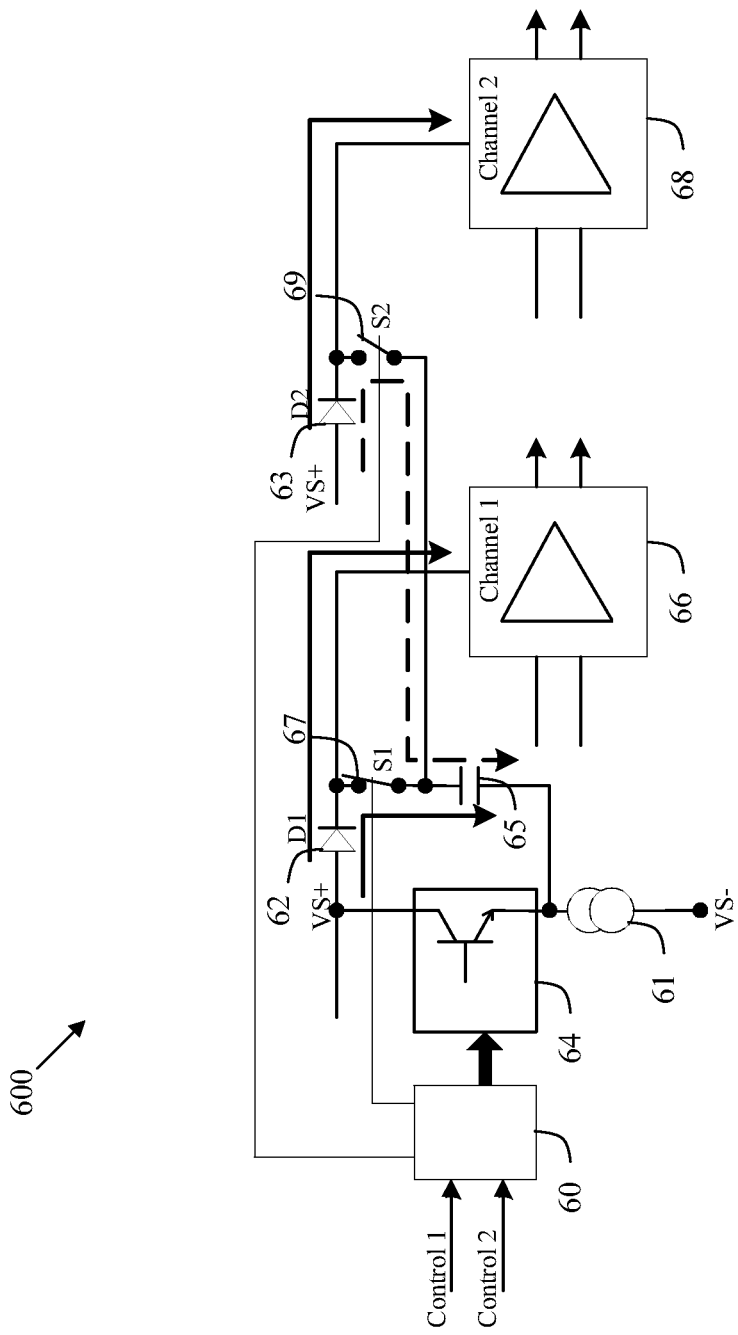
FIG. 7 is a schematic diagram of another embodiment of a dual channel line driver.

FIG. 7 illustrates one case of controlling and activating the components of the dual channel line driver 600, e.g. according to the control scheme described above. Specifically, the components may be controlled when both Control 1 and Control 2 indicate the charge pump disable state, e.g. at the logic circuit 60. When the control signals are received, the charge pump 64 may be disabled and both D1 and D2 may be forward biased. Additionally, one of the switches, S1 and S2, may be initially closed or both S1 and S2 may be closed. The voltage VS+ may also be initially supplied to both Channel 1 and Channel 2, and may charge the capacitor 65 via the current mirror 61 and S1 and/or S2. In this disable state, the charge pump 64 may be disabled and thus improved or higher power efficiency may be achieved.

Figure 8:
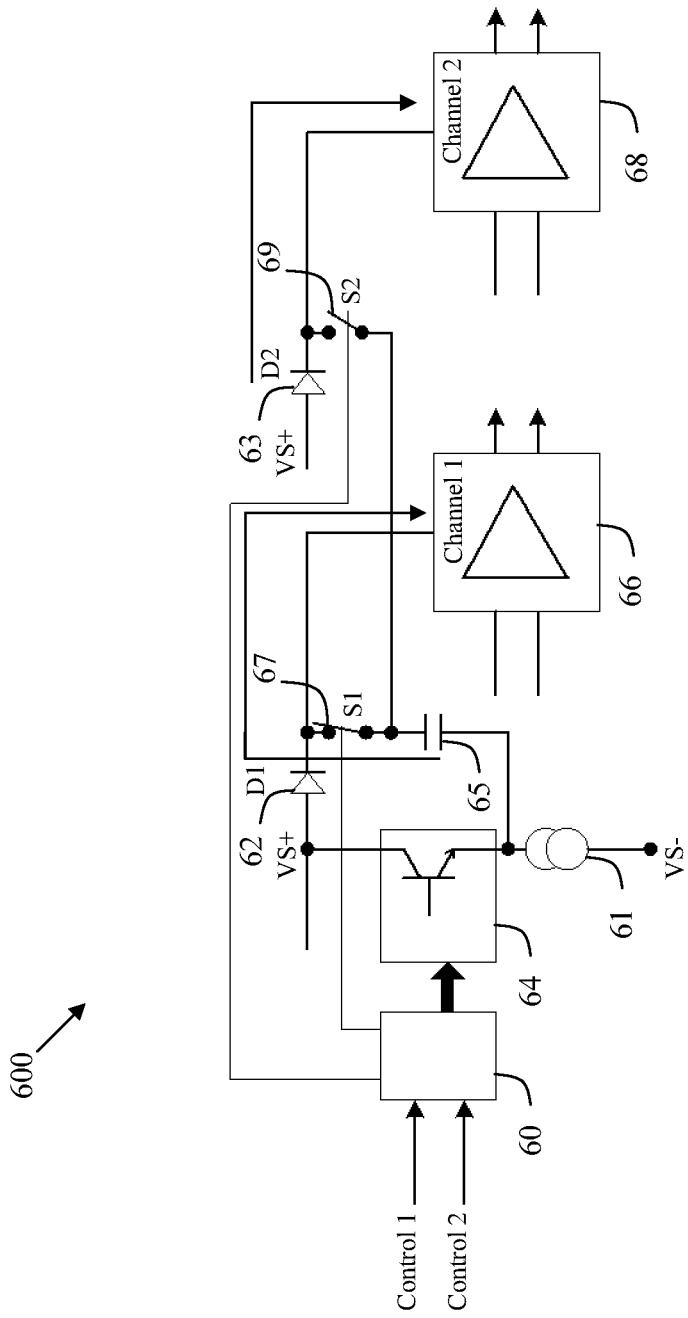
FIG. 8 is a schematic diagram of another embodiment of a dual channel line driver.

FIG. 8 illustrates another case of controlling and activating the components of the dual channel line driver 600. Specifically, the components may be controlled when one of the channels Channel 1 and Channel 2 may use the boosted high voltage power supply. For example, when Channel 1 receives a high peak signal (or an expected high peak signal), then Control 1 may indicate the charge pump active state, and Control 2 may indicate the charge pump disable state. As such, the charge pump 64 may be switched to the active state, S1 may be closed, and S2 may be opened. Additionally, D1 may be reverse biased, D2 may be forward biased, and VS+ may be supplied to the second line driver 68 of Channel 2, as indicated by the L-shaped solid directional arrow in FIG. 8. Further, the capacitor 65 may discharge its voltage to the first line driver 66 of Channel 1, as indicated by the U-shaped solid directional arrow in FIG. 8.

Figure 9:
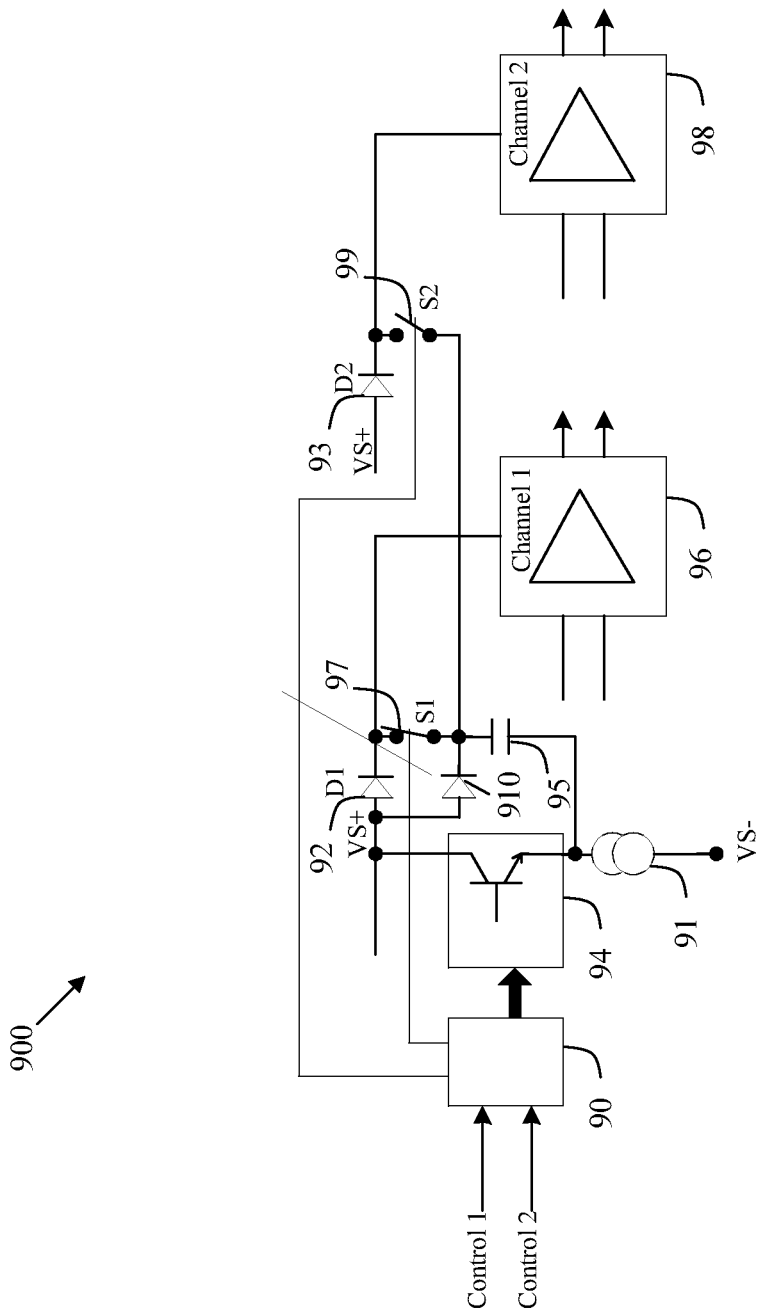
FIG. 9 is a schematic diagram of another embodiment of a dual channel line driver.

FIG. 9 illustrates an embodiment of another dual channel line driver 900, which may have reduced power consumption and improved power efficiency. The dual-channel line driver 900 may comprise a first diode 92 (D1), a charge pump 94, a capacitor 95, a first line driver 96 that corresponds to a first channel (Channel 1), a second line driver 98 that corresponds to a second channel (Channel 2), a logic circuit 90, at least one current mirror 91, a second diode 93 (D2), a first switch 97 (S1), and a second switch 99 (S2), which may be configured substantially similar to the corresponding components of the dual channel line driver 600. Additionally, the dual-channel line driver 900 may comprise a third diode 910, which may be positioned between the charge pump 94 and the first switch 97, as shown in FIG. 9.

The third diode 910 may be used to charge the capacitor and/or simplify the control logic of the dual-line driver 900, e.g. in comparison to the control logic of the dual-channel line driver 600. Accordingly, when Control 1 indicates the charge pump active state, S1 may be closed. When Control 2 indicates the charge pump active state, S2 may be closed. However, when neither Control 1 nor Control 2 indicates the charge pump active state, both S1 and S2 may be opened, and the voltage VS+ may be supplied to charge the capacitor 95 via D3 and the current mirror 91. This control scheme and configuration may be applied to any multi-channel line driver.

Figure 10:
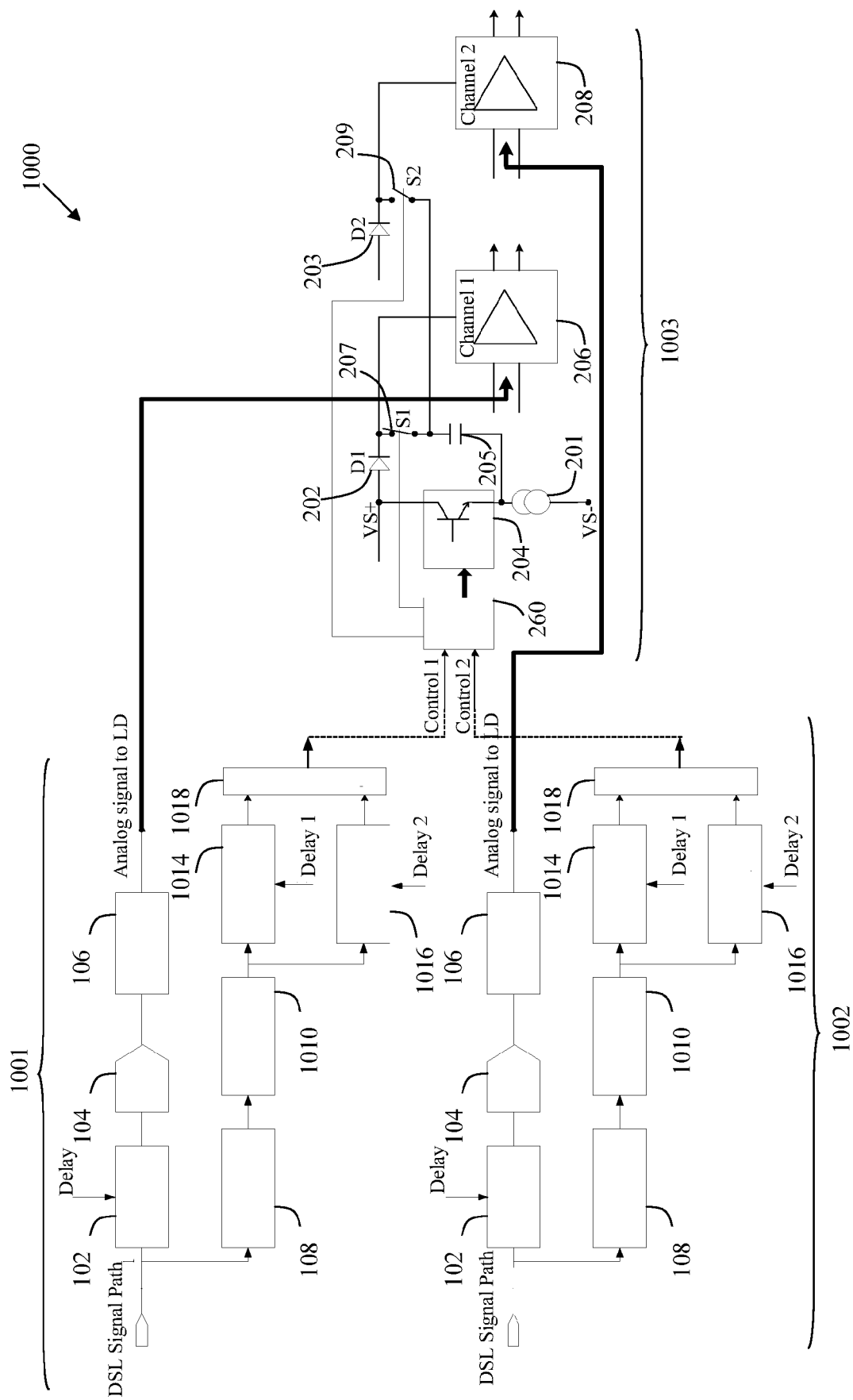
FIG. 10 is a schematic diagram of another embodiment of a multi-channel line driver.

FIG. 10 illustrates an embodiment of another dual channel line driver 1000, which may have reduced power consumption and improved power efficiency. The dual channel line driver 900 may comprise a plurality of line drivers, e.g. Class H line drivers that correspond to a plurality of channels. The dual-channel line driver 1000 may comprise a first line driver 1001 and a second line driver 1002, which may be coupled to a control block 1003. The first line driver 1001 and the second line driver 1002 may each comprise a delay circuit 102, a DAC 104, a filter circuit 106, a peak predictor 108, a peak detector 1010, a control interface logic 1018, a long timing delay circuit 1014, and a short timing delay circuit 1016, which may be configured substantially similar to the corresponding components of the line driver 300. The control block 1003 may comprise a first diode 202 (D1), a charge pump 204, a capacitor 205, a first line driver 206 that corresponds to a first channel (Channel 1), a second line driver 208 that corresponds to a second channel (Channel 2), a logic circuit 260, at least one current mirror 201, a second diode 203 (D2), a first switch 207 (S1), and a second switch 209 (S2), which may be configured substantially similar to the corresponding components of the dual channel line driver 600.

According to the control logic of the dual-channel line driver 1000, when both Channel 1 and Channel 2 receive or are expected to receive a low peak signal, both Control 1 and Control 2 signals may indicate the charge pump disable state. Accordingly, the charge pump 204 may be disabled, both diodes D1 and D2 may be forward biased, and at least one of the switches S1 and S2 may be closed. Additionally, the voltage VS+ may be supplied to both the first line driver 1001 and the second line driver 1002 and charge the capacitor 205 via S1 or S2 and the current mirror 201. Since the charge pump is disabled in this state, higher power efficiency may be achieved. Next, when Channel 1 receives a high peak signal and Channel 2 receives a low peak signal, Control 2 may indicate the charge pump disable state for Channel 2 and Control 1 may change from the charge pump disable state to the charge pump ready state after, e.g. after a time Delay 2. Subsequently, Control 1 may change from the charge pump ready state to the charge pump active state after a time Delay 1. In this process, the control state changes in order from the charge pump disable state, the charge pump ready state, and then to the charge pump disable state again. The charge pump's state may also change following the change in control state for Channel 1. When charge pump 204 is active, S1 may be closed, the power supply of Channel 1 may switch to the boosted high voltage, and the power supply of Channel 2 may remain at the VS+ level.

Although the dual-channel line driver 1000 is shown to comprise two line drivers, other embodiments of the dual-channel line driver 1000 may comprise more than two line drivers. In an alternative embodiment, one of the line drivers in the dual-channel line driver 1000 may be configured similar to the line driver 400. Additionally or alternatively, the components of the control block 1003 of the dual-channel line driver 1000 may comprise a third diode D3 and may be substantially similar to the components of the dual-channel line driver 1000. As such, the control logic for activating the charge pump 204 and applying the appropriate voltage level to the individual line drivers may be reduced in complexity, as described above.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a first time delay component;
a second time delay component; and
a peak detector coupled to the first time delay and the second time delay,
wherein the first time delay component is configured to:
receive a peak signal that corresponds to a digital subscriber line (DSL) signal from the peak detector; and
delay the peak signal by a first time period to form a first control signal,
wherein the second time delay component is configured to:
receive the peak signal that corresponds to the DSL signal from the peak detector; and
delay the peak signal by a second time period to form a second control signal, and
wherein the first control signal and the second control signal are sent to a charge pump configured to boost a voltage for a line driver.

2. The apparatus of claim 1, wherein the second time period is relatively shorter than the first time period.

3. The apparatus of claim 1, wherein the first control signal is provided to the charge pump to adjust the voltage of the line driver.

4. The apparatus of claim 3, wherein the first time period is set such that the first control signal boosts the voltage at about the same time the line driver receives a peak within the DSL signal.

5. The apparatus of claim 1, wherein the second control signal is provided to the charge pump to power on the charge pump.

6. The apparatus of claim 5, wherein the second time period is set such that the second control signal powers on the charge pump in advance of receiving the first control signal.

7. The apparatus of claim 1, wherein the second time delay component is further configured to generate a third control signal that powers off the charge pump after boosting up the voltage for the line driver.

8. The apparatus of claim 1, further comprising a control interface logic that is coupled to the first time delay component and the second time delay component, wherein the control interface logic is configured to select at least one of the following: the first control signal and the second control signal to forward to the charge pump.

9. The apparatus of claim 1, wherein the peak detector is configured to:
receive a predicted peak signal that corresponds to the DSL;
detect one or more peak values from the predicted peak signal;
compare the peak values with one or more threshold values to form the peak signal; and
forward the peak signal to the first time delay component and the second time delay component.

10. The apparatus of claim 9, further comprising a peak predictor configured to predict subsequent peaks for the DSL signal to form the predicted peak signal and forward the predicted peak signal to the peak detector.

11. A network component comprising:
a peak detector control module configured to:
receive a peak signal based on an incoming digital subscriber line (DSL) signal;
generate a first control signal to boost a voltage for a line driver using a charge pump; and
generate a second control signal to power on a charge pump,
wherein the first control signal is generated by applying a first time delay to the peak signal,
wherein the second control signal is generated by applying a second time delay to the peak signal, and
wherein the second time delay is less than the first time delay.

12. The network component of claim 11, wherein the second time delay delays the second control signal to power on the charge pump in advance of receiving the first control signal.

13. The network component of claim 11, wherein the first time delay delays the first control signal to boost the voltage when the line driver receives a peak within the DSL signal.

14. The network component of claim 11, wherein the peak detector control module is further configured to generate a third control signal to turn off boosting of the voltage for the line driver using the charge pump.

15. The network component of claim 14, wherein the third control signal is generated after a first predetermined time elapses from boosting the voltage.

16. The network component of claim 11, wherein the peak detector control module is further configured to generate a third control signal to power off the charge pump, and wherein the third control signal is generated after a first predetermined time elapses from boosting the voltage.

17. A method comprising:
receiving a first control signal that corresponds to a first line driver;
receiving a second control signal that corresponds to a second line driver;
switching a charge pump to a charge pump active state when at least one of the following occurs: the first control signal indicates the charge pump active state and the second control signal indicates the charge pump active state; and
switching the charge pump to an idle state when neither the first control signal and the second control signal indicate the charge pump active state and the first control signal, second control signal, or both indicate the idle state,
wherein the charge pump active state operates the charge pump to boost a voltage supplied to at least one of the following: the first line driver and the second line driver, and
wherein the idle state turns on the charge pump.

18. The method of claim 17, further comprising disabling the charge pump when both the first control signal and the second control signal indicate a charge pump disable state.

19. The method of claim 18, further comprising switching the charge pump to the charge pump active state after the charge pump is operating in the idle state and switching the charge pump to the idle state after the charge pump is in the charge pump disable state.

20. The method of claim 17, wherein the first control signal is delayed for a predetermined time period such that the charge pump is in the charge pump active state when the first line driver receives a peak within a digital subscriber line (DSL) signal.

* * * * *